United States Patent [19]

McFetridge

[11] Patent Number: 4,758,880

[45] Date of Patent: Jul. 19, 1988

[54] VIDEO MATTE GENERATOR

[75] Inventor: Grant T. McFetridge, Nevada City, Calif.

[73] Assignee: The Grass Valley Group, Inc., Grass Valley, Calif.

[21] Appl. No.: 32,140

[22] Filed: Mar. 27, 1987

[51] Int. Cl.$^4$ .......................... H04N 9/45; H04N 9/68
[52] U.S. Cl. ....................................... 358/19; 358/28; 358/29
[58] Field of Search .................. 358/19, 20, 23, 24, 358/25, 27, 28, 29, 40, 22

[56] References Cited

U.S. PATENT DOCUMENTS

| 4,635,097 | 1/1987 | Tatami | 358/19 |
| 4,680,621 | 7/1987 | Baker | 358/19 |

Primary Examiner—Tommy P. Chin
Attorney, Agent, or Firm—John Smith-Hill; Francis I. Gray

[57] ABSTRACT

A matte generator for generating a video signal representative of a matte having a uniform color, has an operator interface for generating signals representing three independent variables which are sufficient to characterize a color. A processor receives the input signals and derives three numerical values from the input signals and from calibration values provided to the processor, and a quadrature modulator receives a subcarrier signal and signals representing the three numerical values and generates an encoded video signal in response thereto. The encoded video signal and a calibration signal are applied to a calibration circuit for comparing the encoded video signal and the calibration signal and providing an output signal representative of the relationship therebetween. The output signal of the calibration circuit is applied to the processor and is used to generate calibration values such that the encoded video signal is brought into predetermined relationship with the calibration signal.

9 Claims, 2 Drawing Sheets

VIDEO MATTE GENERATOR

This invention relates to a video matte generator.

BACKGROUND OF THE INVENTION

In a conventional matte generator, component signals representative of a luminance component and two color difference components are generated at an operator interface and are applied to a video encoder which also receives horizontal and vertical sync signals and a continuous wave subcarrier reference signal. The encoder might be, for example, a type MC 1377 integrated circuit. The encoder combines the component signals, the sync signals and the subcarrier reference signal to generate a full field baseband video signal representing a solid color. The matte generator may be integrated within a production switcher, or it may be a stand-alone unit. In the production switcher, the matte signal is combined with an external video signal to produce an output video signal. In order for the signals to be combined satisfactorily, it is necessary that the horizontal and vertical timing of the two signals be aligned, and that if the matte signal includes a color burst, the burst of the matte signal be in phase with the burst of the external video signal. In order to adjust the phase of the burst of the matte signal relative to the burst of the second video signal, an adjustable delay network is interposed in the path of the reference subcarrier signal applied to the encoder, and the delay introduced by the delay network is adjusted so that the burst of the matte signal is in phase with the burst of the external video signal.

If multiple matte generators are included in a production switcher and each matte generator generates a matte signal which includes a color burst, it is necessary for the bursts of all the matte signals to be in phase with each other and with the burst of the external video signal. It is very time-consuming and inconvenient to adjust manually the phase of each matte generator.

SUMMARY OF THE INVENTION p A preferred embodiment of the present invention is a matte generator for generating a video signal representative of a matte having a uniform color, comprising input means for generating signals representing three independent variables which are sufficient to characterize a color. A processor receives the input signals and derives three numerical values from the input signals and from calibration values provided to the processor, and a quadrature modulator receives a subcarrier signal and signals representing the three numerical values and generates an encoded video signal in response thereto. The encoded video signal and a calibration signal are applied to a calibration circuit for comparing the encoded video signal and the calibration signal and providing an output signal representative of the relationship therebetween. The output signal of the calibration circuit is applied to the processor and is used to generate calibration values such that the encoded video signal is brought into predetermined relationship with the calibration signal.

By adjusting the calibration values, it becomes possible to bring the burst of the matte signal into phase with the burst of another video signal. It is also possible to eliminate the need for manual calibration of offset, gain and quadrature errors.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
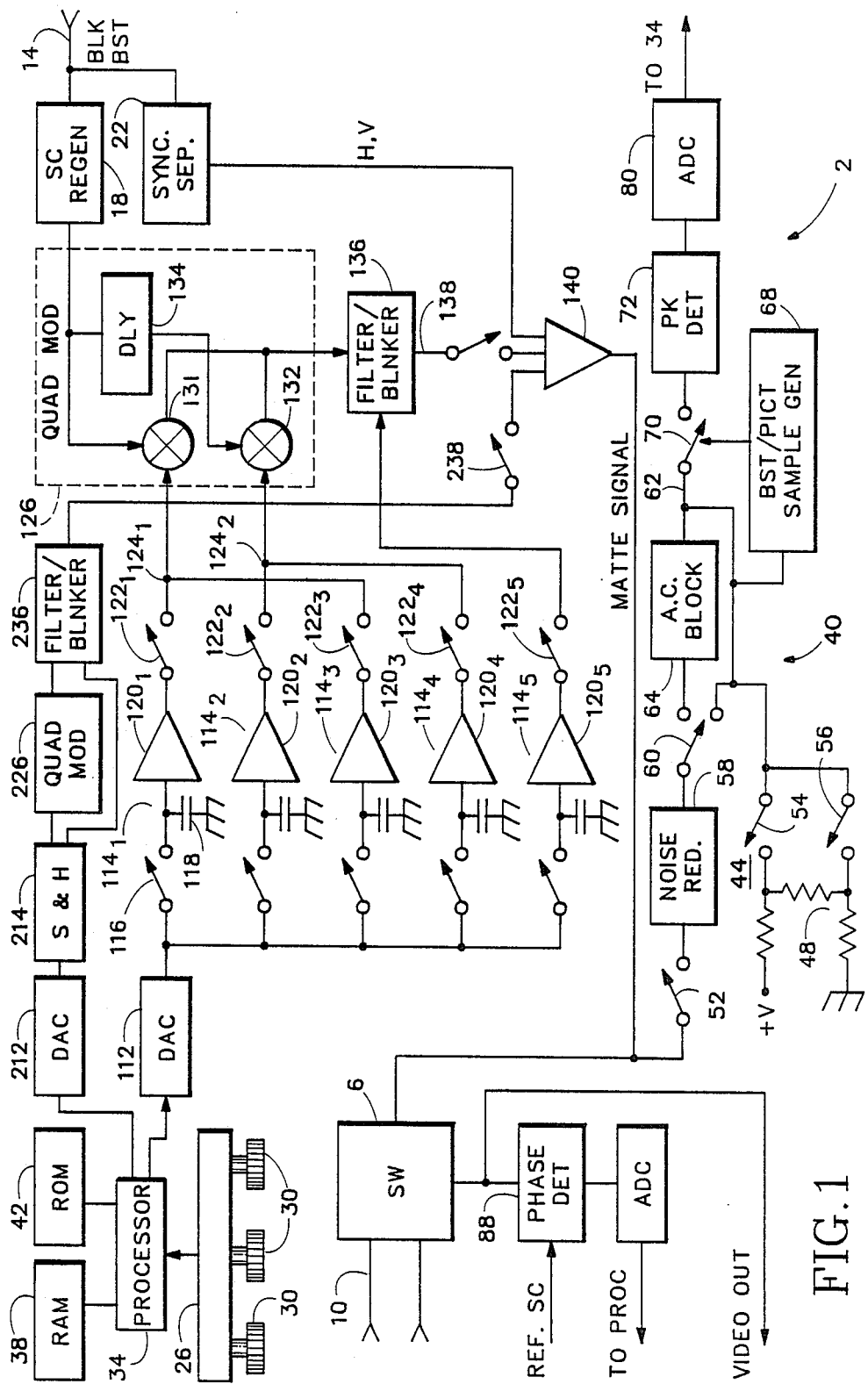
FIG. 1 is a block diagram of a production switcher incorporating a matte generator embodying the present invention.

The production switcher illustrated in FIG. 1 is operable in either a PAL mode or an NTSC mode. Operation in the NTSC mode will be described first.

The production switcher incorporates a matte generator 2 and a switching network 6. The switcher has terminals 10 at which it receives external video signals and a terminal 14 at which it receives a reference composite video signal. The sync and burst of the reference video signal conform to the NTSC standard. The reference video signal is applied to a subcarrier regenerator 18 and a sync separator 22. The subcarrier regenerator generates a continuous wave reference subcarrier signal which is locked in phase to the burst of the reference video signal and is at a frequency of 3.58 MHz, and the sync separator provides horizontal and vertical sync signals. The matte generator 2 provides a full-field composite matte signal which conforms to the NTSC standard and is representative of a solid color selected by the operator of the production switcher using an operator interface 26. The matte signal and a selected external video signal are combined by the switching network 6 to produce an output video signal.

The operator interface includes three control knobs 30 which are independently adjustable. Each control knob generates a digital signal representing the angular position of the knob. The digital signals are representative of luminance (Y), hue ($\theta$) and saturation (M) respectively. The three digital signals are applied to the matte generator.

Figure 2:
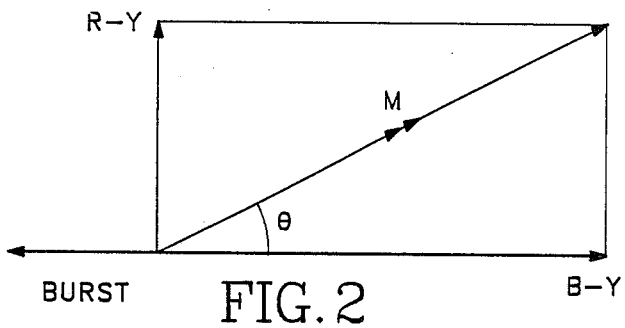
FIGS. 2, 3, 4, 5(a), 5(b) and 6 are vector diagrams which are employed in explaining the operation of the matte generator.

The composite NTSC video signal is generated from a luminance component Y and two color difference or chrominance components (R-Y) and (B-Y) by employing the two chrominance components to modulate respective continuous wave (c.w.) reference subcarrier signals which are in phase quadrature, combining the two modulated subcarrier signals, and adding the luminance component to the combined modulated subcarrier signals. If the phase of the c.w. signal that is modulated by the (B-Y) component is taken as 0° then the phase of the c.w. signal that is modulated by the (R-Y) component is 90° and the color burst of the composite signal is at a phase of 180°. The burst and chrominance vectors are illustrated in FIG. 2.

The digital signals provided by the control knobs are applied to a processor 34 and the values of Y, $\theta$ and M are written into a random access memory 38. The processor operates on the luminance, hue and saturation values in accordance with a program stored in a program memory 42 and utilizing calibration constants stored in the random access memory 38, and generates values C1 and C2. The operations that are performed on the values of Y, $\theta$ and M to generate the values C1 and C2 will be described in further detail below. The processor 34 also generates values A1 and A2. The processor provides two multiplexed digital output signals within each vertical blanking interval of the black burst signal. The successive words of the first signal represent values of A1, A2, X, X and zero, where X is an arbitrary (don't care) value, and are applied to a first digital-to-analog converter (DAC) 112 which provides at its output terminal an analog signal of which the voltage during successive clock intervals of the first signal represents the values of A1, A2, X, X and zero. The analog output signal of the DAC 112 is applied to five samples and holds $114_1 \ldots 114_5$, each of which comprises a switch 116, a capacitor 118 and an amplifier 120. The output voltages of the amplifiers $120_1 \ldots 120_5$ represent A1, A2, X, X and zero respectively. The output terminals of the amplifiers $120_1$ and $120_3$ are connected by way of respective switches $122_1$ and $122_3$ to a terminal $124_1$ and similarly the output terminals of the amplifiers $120_2$ and $120_4$ are connected by switches $122_2$ and $122_4$ to a terminal $124_2$. The terminals 124 are connected to a quadrature modulator 126. The switches $122_1$ and $122_2$ remain closed and the switches $122_3$ and $122_4$ remain open.

The quadrature modulator 126 comprises two modulators 131 and 132 which have modulating inputs at which they receive the signals at the terminals $124_1$ and $124_2$ respectively and have carrier inputs at which they receive the reference subcarrier signal. A delay line 134 is connected in the path to the carrier inputs of the modulator 132. The delay line interposes a delay of $(90-Q)/360$ times the period of the reference subcarrier signal, with Q ideally being zero.

The output signal provided by the quadrature modulator 126 is combined with the output signal of the amplifier $120_5$ in a filter and blanker 136 and the resulting signal is applied through a switch 138 to a summing amplifier 140.

The successive words of the second signal provided by the processor represent the values of C1, C2, X, X and Y and are applied to DAC 212, sample and hold 214, quadrature modulator 226 and filter and blanker 236 which operate in essentially identical fashion to the DAC 112, the sample and hold 114, the quadrature modulator 126 and the filter and blanker 136 respectively. The output signal of the filter and blanker 236 is applied through a switch 238 to the summing amplifier, which also receives the horizontal and vertical sync signals. The Processor 34 operates the switches 138 and 238 to select the modulator 126 during only the burst interval of each active line in the field of the reference video signal and to select the modulator 226 during only the active picture interval. Thus, during the blanking interval of each horizontal line, the output signal of the amplifier 140 comprises a front porch interval, followed by a horizontal sync pulse and a back porch interval.

Figure 3:
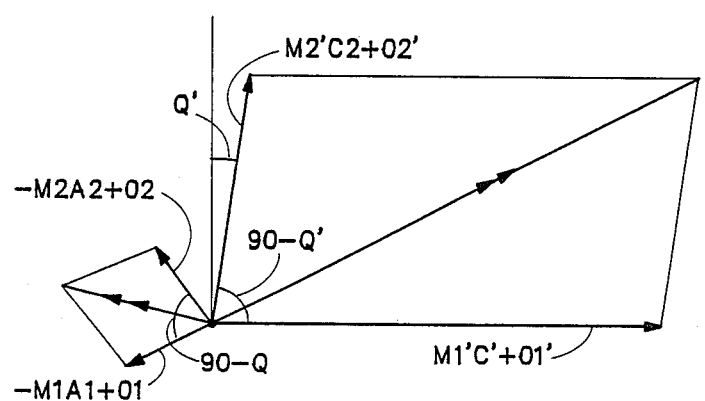

Commercially-available quadrature modulators, such as those that are incorporated in the type MC 1377 integrated circuit, are subject to disadvantage in that they can introduce offset, gain and quadrature errors. Consequently, the output signal of the amplifier 140 is not given by the vectors (−Mb, 0) and (B-Y, R-Y), where Mb represents nominal burst amplitude, but by vectors having components (−M1A1+01, −M2A2+02) and (M1′C1+01′, M2′C2+02′) along axes which are not mutually perpendicular but are disposed at angles of $90°-Q$ and $90°-Q'$, as shown in FIG. 3. The offset, gain and quadrature errors result in the color represented by the matte signal not conforming to the desired color set by the operator interface controls. In order to correct the errors, it is possible to choose the values of A1, A2, C1 and C2 to compensate for the offset, gain and quadrature errors. The values of M1, M2, M1′, M2′, 01, 02, 01′, 02′, Q and Q′ are derived by the processor 34 and are used as calibration constants in calculating suitable values of A1, A2, C1 and C2.

In order to enable the calibration constants to be derived, the matte generator 2 includes a calibration circuit 40. The calibration circuit 40 comprises an input section 44 which receives both the output signal of the matte generator and two D.C. calibration voltages provided by a calibration voltage source 48. The input section 44 includes switches 52, 54 and 56 for selecting the matte signal or one of the calibration voltages. A noise reduction filter 58 is connected to the switch 52. A switch 60 is used to connect the output terminal of the filter 58 to the output terminal 62 of the input section 44 either directly or by way of an A.C. blocking filter 64. The output signal provided by the input section 44 is applied to both an amplitude detector and a burst/picture sample generator 68. The amplitude detector comprises a switch 70 and a peak detector 72. Assuming that the switch 70 is closed when a first signal is applied to the amplitude detector, the peak detector provides a signal representative of the peak value of the first signal. The peak value signal is converted to digital form by an analog-to-digital converter 80 and is applied to the processor 34, which stores the digitized peak value. When a second signal is applied to the amplitude detector, the digitized peak value of the second signal is applied to the processor 34, and the difference between the two digital values is determined.

The burst/picture sample generator 68 has an output terminal which is connected to the amplitude detector to control the state of the switch 70. When the switch 52 of the input section 44 selects the output signal of the matte generator, the burst/picture sample generator causes the switch 70 to close during the burst interval or the picture interval of the matte signal, depending on which of the quadrature modulators is being calibrated.

The calibration of the modulator 126 involves calculating the values of the offset, gain and quadrature calibration constants 01, 02, M1, M2 and Q. The offset and gain calibration constants can be calculated using conventional techniques. The quadrature calibration constant can be derived by comparing the peak values that are obtained for vectors that are ideally at +45° and −45° with reference to the (B-Y) axis and adjusting the value of Q until the peak values are equal.

It is preferred, but not essential, that the offset and gain calibration constants be calculated before the quadrature calibration constant is calculated, in order to avoid unnecessary iterations.

Figure 4:
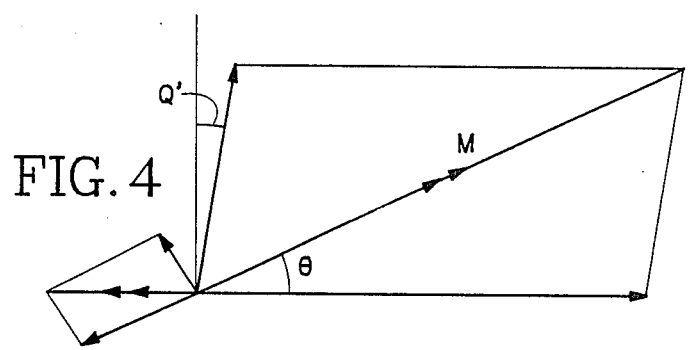

The values of 01, 02, M1, M2 and Q are used to determine the values of A1 and A2 such that the resultant of the vector having the components (−M1A1+01, −M2A2+02) at an angle of $90°-Q$ is identical to the vectors having the components (−Mb, 0) at 90°, as shown in FIG. 4.

The values of 01′, 02′, M1′, M2′ and Q′ for calibrating the modulator 226 are derived in similar fashion.

When proper offset, gain and quadrature calibration constants have been calculated, the matte signal provided by the matte generator represents the solid color selected by the operator.

Figure 5B:
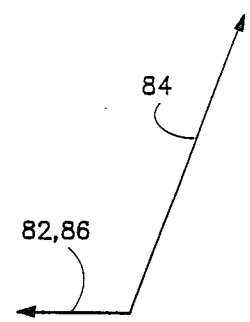
Figure 5A:
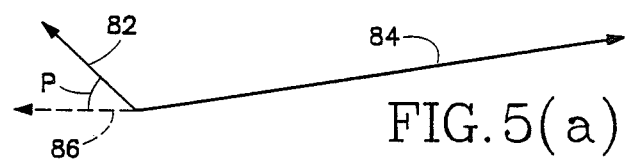

In order to combine a matte signal having a color burst with an external video signal, it is necessary that the burst of the matte signal be in phase with the burst of the external video signal. However, the phase of the burst of the matte signal is determined by the phase of the reference subcarrier signal and is not necessarily the same as that of the burst of the external video signal. In FIG. 5(a), the burst and the chromaticity component of the matte signal are illustrated by the vectors 82 and 84, while the vector 86 represents the burst of the external video signal. It is necessary to effectively rotate the vectors 82 and 84 through a phase offset angle P so that they remain in the same angular relationship but the vector 82 coincides with the vector 86, as shown in FIG. 5(b). The matte signal may be adjusted to bring its burst into phase with the burst of the external video signal manually, with the aid of a vector monitor, but it is preferred that the adjustment be accomplished automatically, by use of a phase detector 88. One method by which phase calibration may be carried out automatically is described in co-pending application Ser. No. 07/032,142 filed Mar. 27, 1987 by Grant T. McFetridge entitled "Method and Apparatus for Calibrating the Phase of a Video Signal", the disclosure of which is hereby incorporated by reference herein.

Figure 6:
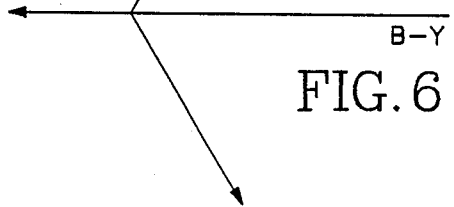

In the PAL system, the phase relationship between the R-Y chrominance component and burst changes on alternate lines, and accordingly the chromaticity information in the video signal can be represented by a vector having the components (R−Y, B−Y) or a vector having the components (−[R−Y], B−Y) depending on whether the line is odd-numbered or even-numbered. The chromaticity information is then represented on a vector monitor as two vectors which are symmetrically disposed about the B−Y axis, as shown in FIG. 6. If the phase offset P is not an integral multiple of 90°, the components that are necessary to provide the appropriate chromaticity vector on odd-numbered lines are different from those required to produce the vector required on even-numbered lines. Accordingly, in the PAL mode of operation the successive words in the second output signal of the processor represent the values of C1, C2, C3, C4 and Y and the analog output voltages of the amplifiers represent C1, C2, C3, C4 and Y. The switches $122_1$ and $122_2$ are closed on odd-numbered lines and the switches $122_3$ and $122_4$ are closed on even-numbered lines. It will be understood that if the modulators were ideal, the output signal of the amplifier 140 would be a full-field baseband composite signal which conforms to the PAL standard and represents a matte of uniform color. In the PAL system, the subcarrier frequency is 4.43 MHz.

In order to calibrate the modulators for operation in the PAL mode, it is necessary to compute four offset calibration constants 01, 02, 03 and 04. In computing the values of 02 and 04, the reference subcarrier is inverted in phase with respect to its phase when the constants 01 and 03 are computed. Also, it is necessary to derive two values of the phase offset angle P, for odd-numbered and even-numbered lines respectively.

It will be appreciated that the present invention is not restricted to the particular embodiment that has been described, and that variations may be made therein without departing from the scope of the invention as defined in the appended claims and equivalents thereof. For example, although use of two quadrature modulators 126 and 226, and associated input and output circuits, has been described, a single quadrature modulator could be used instead if it were switched to receive the outputs of the sample and holds 114 during the horizontal blanking interval and the outputs of the sample and holds 214 during the active picture interval. Also, in some cases it may not be necessary for the matte signal to include a color burst, and in such a case the DAC 112, sample and hold 114, modulator 126 and filter and blanker 136 would not be required, and it would only be necessary to calibrate the modulator 226 by reference to the chromaticity information in the picture interval. In this case, the burst/picture sample generator 68 would close the switch 70 during the picture interval instead of the burst interval, because the burst would be absent. Even if the matte signal did not include a color burst, it would be necessary that the modulation axes of the matte signal be aligned with those of the external video signal in order to ensure that the phase relationship between the matte signal and the burst of the external video signal defines a color which lies inside the boundary of valid NTSC color space.

I claim:

1. A matte generator for generating a video signal representative of a matte having a uniform color, comprising:
    input means for generating component signals representing three independent variables that are sufficient to characterize a selected color,
    modulator means for receiving the component signals and a reference subcarrier signal and generating an encoded video signal in response thereto,
    calibrator means for receiving the encoded video signal and providing an output signal representative of the relationship between the value of a parameter of the encoded video signal and a previously-determined value, and
    feedback means for applying the output signal to the input means as a control signal for adjusting the component signals in a manner such that the value of said parameter of the encoded video signal is brought into a predetermined relationship with said previously-determined value.

2. A matte generator according to claim 1, wherein the input means comprise input terminals for receiving signals representative of the luminance, hue and saturation of the selected color, and the component signals comprise a luminance component signal and two chrominance component signals, the two chrominance component signals each having a value representative of the difference between the luminance of a primary color component of the selected color and the luminance of the selected color.

3. A matte generator according to claim 1, wherein the component signals are a luminance component signal and two chrominance component signals and the modulator means comprise at least one quadrature modulator for receiving the chrominance component signals and the reference subcarrier signal and generating an encoded chrominance signal in response thereto, and means for combining the luminance component signal with the encoded chrominance signal to generate the encoded video signal.

4. A matte generator according to claim 3, wherein the input means comprise a processor means for receiving input signals representative of the luminance, hue and saturation of the selected color and carrying out mathematical operations upon the values of the luminance, hue and saturation to generate the luminance component signal and the chrominance component signals.

5. A matte generator according to claim 4, wherein the processor means are operative to compensate for offset, gain and quadrature errors introduced by the modulator means.

6. A matte generator according to claim 5, wherein the encoded video signal includes a burst at subcarrier frequency, and the processor means are operative to adjust the phase of the burst.

7. A method of generating a video signal representative of a matte having a uniform color, comprising:
generating chrominance component signals representing the chrominance of a selected color and a luminance component signal representing the luminance of the selected color,
combining the component signals and a reference subcarrier signal to provide an encoded video signal in response thereto,
measuring the relationship between the value of a parameter of the encoded video signal and a previously-determined value of that parameter, to provide a measured valve and
employing the measured value of the relationship to adjust at least one of the chrominance component signals in a manner such that the value of said parameter of the encoded video signal is brought into a predetermined relationship with said previously-determined value.

8. A method according to claim 7, wherein each of the chrominance component signals has a magnitude which is of the form MA+O, where A represents the difference between the luminance of a primary color component of the selected color and the luminance of the selected color and O and M are constants, and the employing step comprises determining the values of O and M.

9. A method according to claim 7, wherein the encoded video signal includes a color burst, said parameter of the encoded video signal is the phase of the color burst, and the previously-determined value of said parameter is the phase of the color burst of a reference video signal.

* * * * *